United States Patent
Haruna et al.

(10) Patent No.: US 9,641,479 B2
(45) Date of Patent: May 2, 2017

(54) INTERWORKING BETWEEN MESSAGING SERVICE DOMAINS

(75) Inventors: Adamu Haruna, Tampere (FI); Hans Rohnert, München (DE); Ivo Sedlacek, Lund (SE); Brigitte Van Gerven, Lichtaart (BE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 1291 days.

(21) Appl. No.: 12/865,937

(22) PCT Filed: Feb. 13, 2009

(86) PCT No.: PCT/EP2009/051706
§ 371 (c)(1),
(2), (4) Date: Mar. 14, 2011

(87) PCT Pub. No.: WO2009/101175
PCT Pub. Date: Aug. 20, 2009

(65) Prior Publication Data
US 2011/0161441 A1 Jun. 30, 2011

(30) Foreign Application Priority Data
Feb. 15, 2008 (EP) .................... 08151494

(51) Int. Cl.
*G06F 15/16* (2006.01)
*H04L 12/28* (2006.01)
(Continued)

(52) U.S. Cl.
CPC .............. *H04L 51/36* (2013.01); *H04L 51/28* (2013.01); *H04L 65/1006* (2013.01); *H04L 65/1096* (2013.01); *H04L 51/066* (2013.01)

(58) Field of Classification Search
CPC ..... H04M 1/72547; H04W 4/12; H04W 4/14; H04L 29/08108; H04L 45/04; H04L 45/00; H04L 45/02; H04L 1/72552
(Continued)

(56) References Cited

U.S. PATENT DOCUMENTS

2004/0268265 A1 12/2004 Berger
2005/0068935 A1* 3/2005 Bajko et al. .................. 370/351
(Continued)

OTHER PUBLICATIONS

C. Jennings et al., Session Initiation Protocol (SIP) URIs for Applications such as Voicemail and Interactive Voice Response (IVR), Network Working Group, RFC 4458, Apr. 2006, pp. 1-21.
(Continued)

*Primary Examiner* — Phuoc Nguyen
*Assistant Examiner* — Kishin G Belani
(74) *Attorney, Agent, or Firm* — Squire Patton Boggs (US) LLP

(57) ABSTRACT

An interworking function is provided between first and second messaging domains or technologies, when original address/identities of users in the first domain and the second domain are incompatible. Upon receiving from a sender in the first messaging domain a message addressed to a recipient in the second messaging domain, the interworking function provides, for an original sender address or identity received in the message, a new sender address which is valid in the second messaging domain, and inserts the new address in a header field of the message to be forwarded to the recipient in the second messaging domain. Moreover, the interworking function adds the original sender address into the specific header field of the message either as a part of the new sender address or as an attribute.

23 Claims, 2 Drawing Sheets

(51) Int. Cl.
*H04W 4/00* (2009.01)
*H04L 12/58* (2006.01)
*H04L 29/06* (2006.01)

(58) Field of Classification Search
USPC ........................................................ 709/206
See application file for complete search history.

(56) References Cited

U.S. PATENT DOCUMENTS

2006/0148453 A1\* 7/2006 Knotts ..................... 455/412.1
2008/0113679 A1\* 5/2008 Sung et al. .................. 455/466

OTHER PUBLICATIONS

J. Rosenberg et al., Caller Preferences for the Session Initiation Protocol (SIP), Network Working Group, RFC 3841, Aug. 2004, pp. 1-26.
Open Mobile Alliance, Converged IP Messaging Requirements, Candidate Version 1.0, Nov. 6, 2007, pp. 1-71.

\* cited by examiner

INTERWORKING BETWEEN MESSAGING SERVICE DOMAINS

FIELD OF THE INVENTION

The present invention relates to messaging services, and particularly to interworking between different messaging service domains.

BACKGROUND OF THE INVENTION

IP Multimedia Subsystem (IMS) is a 3rd Generation Partnership Project (3GPP) standardised network architecture that provides an access network independent standardised interface for creating services, charging mechanisms and better Quality of Service (QoS) than best effort. Examples of the services that are implemented on IMS at the moment are PSTN functionality, Push-to-talk over cellular (PoC), Presence, Instant messaging and video sharing.

A Converged IP Messaging (CPM) workgroup inside the Open Mobile Alliance, OMA, aims to remove the silos between traditional messaging services caused by technical differences, and provide users with a smooth, unified service experience. The objective of OMA CPM is to consolidate common functionalities of existing messaging services and new features introduced by the convergence of communications brought by session initiation protocol (SIP) based technologies. These aims are defined in the document "Converged IP Messaging Requirements, Candidate Version 1.0", 6 Nov. 2007 (OMA-RD-CPM-V1_0-20071106-C).

It will be possible for third-party applications to use these capabilities, and these third-party applications also can interact with CPM users as participants. The CPM will also provide the functionality to enable CPM based service users to communicate seamlessly with the users of non-CPM communication services which allow to transport real time media (e.g. audio, video) or discrete media (e.g. text messages) between two or more users, such as Short Message Service (SMS), Multimedia Messaging Service (MMS), email, IMPS (Instant Messaging and Presence Service), Simple/IM (SIP for Instant Messaging and Presence Leveraging Extensions/Instant Messaging), Voice over IP calls, PoC (Push-to-talk over Cellular).

One of the most important and key features in the CPM service deployment is interworking with legacy systems. One of the main problems in interworking is how a recipient responds to a message received via an interworking function (IWF), i.e. a gateway between the CPM environment and the non-CPM environment. When there is interworking between non-CPM environment and CPM environment, the interworking function will sometimes get an address/identity from the non-CPM environment that might not be valid in CPM environment and needs to be resolved for the CPM. For successful interworking, the interworking function might resolve the non-CPM addresses by some other means or allocate temporal CPM addresses for the non-CPM addresses and maintain a table for mapping the temporal CPM addresses with their corresponding or associated non-CPM addresses. The recipient client has to communicate with the sender by sending responses to the interworking function.

Session Initiation Protocol (SIP) is an IETF (Internet Engineering Task Force) application-layer control (signaling) protocol for creating, modifying, and terminating sessions with one or more participants. Some approaches have been proposed for improving the flexibility in routing of the SIP messages. In IETF Request for Comments RFC 4458, the Request-URI (Uniform Resource Identifier) is composed of the SIP Uniform Resource Identifier (URI) containing the voice mail URI and "target" parameter containing the URI of the mailbox as shown below:

```
INVITE
sip:voicemail@example.com;\target=
sip:+15555551002%40example.com; user=phone;\ cause=486 SIP/2.0
```

In other words, RFC4458 puts two URIs into one Request-URI: a combination of the voice mail URI and the mailbox URI. This allows a sender to target the voice mail of the recipient instead of the recipient himself. Thus, the semantics relates to targeting a message to a particular entity of the terminating end point by a sending node.

In RFC 3841, a sender can set up his/her preference in an INVITE request sent to a recipient, i.e. sip:user@example.com, in the accept-contact header as follows:

Accept-Contact: *;actor="msg-taker";audio

The recipient has already registered his/her several contacts and capabilities preference. So when the server receives the INVITE request from the sender, the server does the matching with the preferences. If the matching was successful, then the request is routed accordingly to the appropriate entity of the recipient, i.e. to a voicemail box in this particular example. Thus, RFC 4458 and RFC 3841 propose different mechanisms for solving the same object, i.e. re-routing or routing to a specific entity of the recipient.

BRIEF DESCRIPTION OF THE INVENTION

An object of the present invention is to provide an enhanced mechanism for a communication that traverses different domains or technologies and original addresses/identities of users in one domain maybe modified or not valid in another domain. The object of the invention is achieved by means of methods, a network element, a communication device and programs as claimed in the independent claims. The preferred embodiments of the invention are disclosed in the dependent claims.

According to an aspect of the invention, an interworking function is provided between first and second messaging domains or technologies, when original addresses/identities of users in the first domain can be modified or not valid in the second domain. Upon receiving from sender in the first a messaging domain a message addressed to a recipient in the second messaging domain, the interworking function provides, for an original sender address or identity received in the message, a new address which is valid in the second messaging domain for routing a reply from the recipient to the interworking function, and inserts the new address in a header field of the message to be forwarded to the recipient in the second messaging domain. Moreover, the interworking function adds the original sender address into the specific header field of the message either as a part of the new address or as an attribute.

By the merits of the invention, the interworking function is able to give enough information to the recipient about the sender for the recipient to be able to respond, or allowing the recipient to decide on selection of the mode of the response to a message received from a different messaging domain. For example, the recipient may be able to send a reply to the sender in the first messaging domain selectively either via the interworking function by means of the new address or via another route by means of the original sender address.

For example, if the sender had originally sent an SMS message or an email, the sender's original mobile phone number or email address is provided to the recipient although the message is delivered via the second domain, such as CPM, in which such addressing is not applicable. As a result, the recipient has an option to response via the SMS domain or the Internet, without need to use the second domain, such as the CPM. Conventionally, the recipient client has no means of communication with the sender apart from sending responses to the interworking function. Moreover, the invention allows the recipient to the store and use the original sender address in his/her end device for future communication, possibly via another domain. Presently, the recipient is provided with the allocated temporal valid (e.g. CPM) address of the sender, but the recipient cannot re-use or store this temporal address for future communication as the mapping of the temporal address with the corresponding or associated not valid (e.g. non-CPM address) address in the interworking function is bound to expire at some point of time. The invention also allows decreasing the loading of the interworking function, because the need for maintaining a mapping of a not valid (e.g. non-CPM) address to a temporally allocated valid (e.g. CPM address) is alleviated (e.g. mapping is maintained for a shorter period of time, or not for all senders) or avoided.

BRIEF DESCRIPTION OF THE DRAWINGS

In the following the invention will be described in greater detail by means of preferred embodiments with reference to the attached drawings, in which.

EXEMPLARY EMBODIMENTS OF THE INVENTION

Example embodiments of the present invention will be described using a Converged IP Messaging (CPM) domain of the Open Mobile Alliance, OMA, an example of a converged messaging domain and technology of a recipient. Moreover, PSTN functionality, Push-to-talk over cellular (PoC), Instant messaging (IM), IMPS, SIMPLE IM, Short Message Service (SMS), Multimedia Messaging Service (MMS), email, and Mobile email are examples of messaging service domains that may be used by a sender of a message for transporting real time media (e.g. audio, video) or discrete media (e.g. text messages). The invention is, however, not intended to be restricted to any examples described herein but the present invention may be applied to any communication that traverses different messaging service domains or technologies and original address/identities of users in one domain may be modified or not valid in another domain.

A present scenario of a possible architecture and operation of a Converged IP Messaging (CPM) domain is disclosed in the document "Converged IP Messaging Requirements, Candidate Version 1.0", 6 Nov. 2007, OMA-RD-CPM-V1_0-20071106-C), which is incorporated by reference herein.

Figure 1:
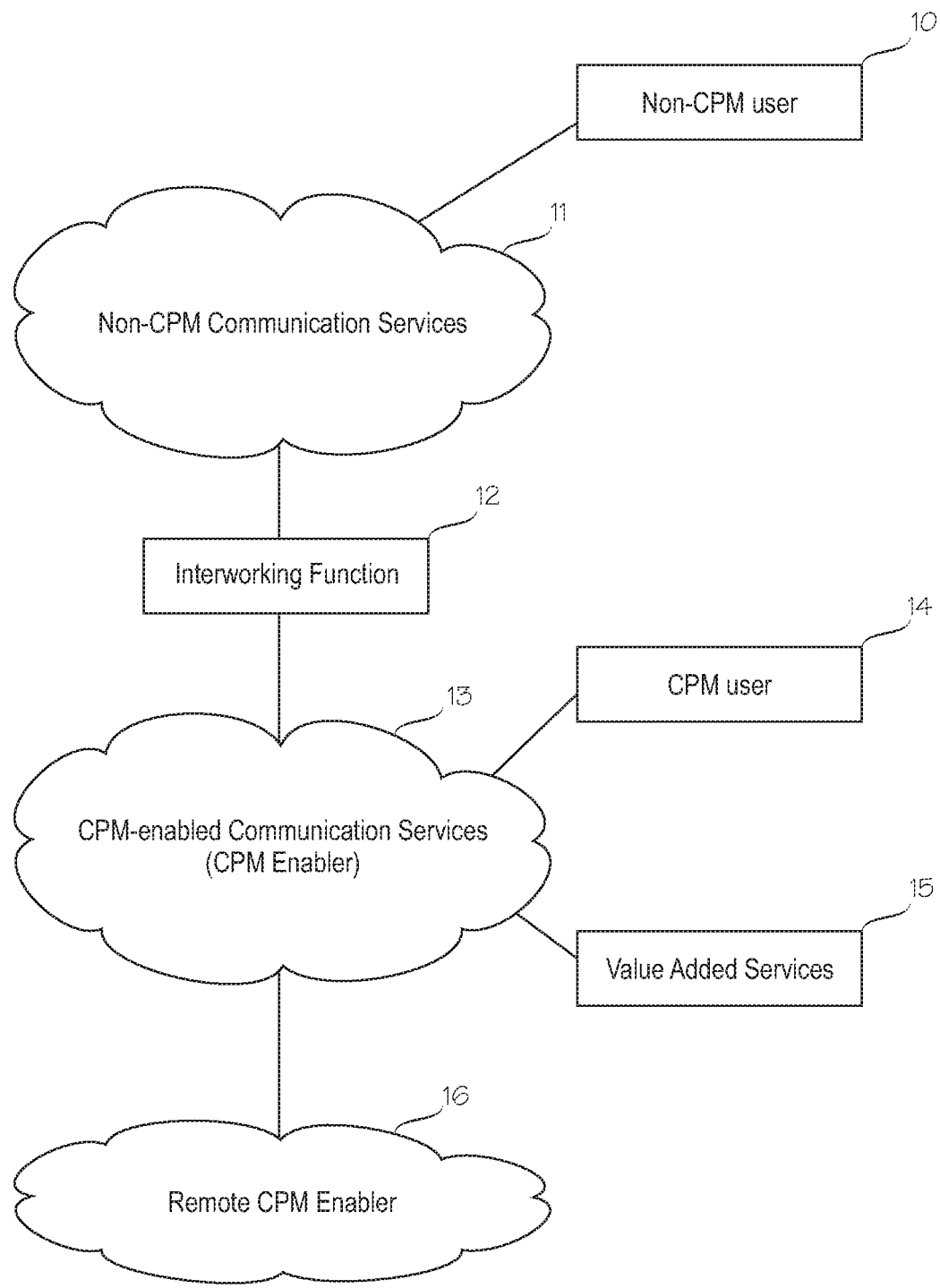
FIG. 1 shows a schematic block diagram illustrating an example of interworking function between different messaging service domains or systems.

Referring to FIG. 1, in the CPM, a service provider offering CPM-enabled services to its subscribers is referred to as a CPM Enabler 13. There may be a plurality of CPM enablers. An exemplary architecture of the CPM domain of one CPM enabler, according to the present scenario of OMA, may comprise various components, entities, or functions, such as a CPM conversation server, CPM clients (user agents of the users), message and media storage, converged address book, CPM user preferences, an interworking function 12, etc. The CPM Enabler 13 may also support a generalized interface for Value Added Service (VAS) 15 to communicate with. The CPM Enabler 13 may also cooperate with other CPM enablers 16. However, the architecture of the CPM domain is not essential to the present invention but may be implemented in any suitable way. Therefore, the CPM domain or enabler is not described or illustrated in more detail herein.

One requirement of the CPM domain 13 is an interworking with non-CPM Communication Service Domains 11 so that users 10 of non-CPM communication services can communicate with CPM users 14 through the CPM service domain 13. The non-CPM users 10 may include one or more of the following: SMS users, MMS users, IMPS users, SIMPLE IM users, POC users, Email users, PSTN/PLMN voice users, and PSTN/PLMN video users, without restricting the invention to these examples of the non-CPM communication services. A seamless transition from legacy services to the CPM based services is also desired.

In the event that both a sender and a recipient are CPM users subscribed to a CPM Service, the communication is straightforward with the SIP URIs or SIPS URIs or tel URIs of the sender and a recipient, as the SIP, SIPS and tel URIs are supported in the CPM domain. The situation is more complicated when the recipient is a CPM user 14 in CPM communication service domain 13 and the sender is a non-CPM user 10 whose original non-CPM address/identity has an addressing scheme different from the SIP, SIPS and tel URI. In such an event, the interworking function 12 may resolve the non-CPM address for the CPM domain, e.g. allocate a temporal CPM address for the non-CPM sender address and maintain a table for mapping all temporal CPM addresses with their corresponding or associated non-CPM addresses. The temporal CPM address is then utilised for the non-CPM user 10 in communication within the CPM domain 13.

As noted above, Session Initiation Protocol (SIP) is a text-based protocol that may be used for establishing, modifying, and terminating multimedia sessions. With SIP it is possible to invite new participants to the existing sessions and modify the media of the existing session. There are two types of SIP messages: Requests and Responses. They share a common format. Basically SIP message may contain three parts: a start-line, message headers and an optional message-body. The start-line and each message-header line are terminated by a carriage-return line-feed sequence (CRLF).

The start line contents of the SIP message vary depending on whether the SIP message is a request or a response. For requests it is referred to as a request line and for responses it is referred to as a status line. The request line may have three components: a method name, a request-URI and the protocol version. Method indicates the type of the request. INVITE method is one of the methods defined in the SIP protocol specification and its extensions. Typically, the INVITE method together with ACK and CANCEL methods are used to set up sessions, while BYE is used for terminating session, REGISTER for registering contact information and OPTIONS for querying servers about their capabilities. INFO and MESSAGE are examples of the methods defined in the extensions of SIP. Request-URI is a SIP or a SIPS URI that identifies the final destination of the request, i.e. the recipient. Protocol version is typically "SIP/2.0".

The response message differs from the request only in the start line, or status line that may have three components: a protocol version, a status code, and a reason phrase. A typical start line for response message is SIP/2.0 200 OK. Header fields may contain information related to the request: for example, the initiator of the request, the recipient of the request and the call identifier. Some headers, such as To and From headers, are mandatory in every SIP request and response. A P-Asserted-Identity header field in a SIP request conveys the identity which results from authentication the sender of the message, when the interworking function receives a message from a non-CPM domain. The P-Asserted-Identity header is the identity that is guaranteed to include a registered and authenticated identity of the sender.

According to exemplary embodiments of the present invention, the interworking function 12 in the CPM domain 13 adds the original non-CPM sender identity/address into the P-Asserted-Identity header field in a SIP request either as a part of the CPM identity/address or as an attribute. The non-CPM sender identity/address may also be inserted into the From header field of the SIP request.

Figure 2:
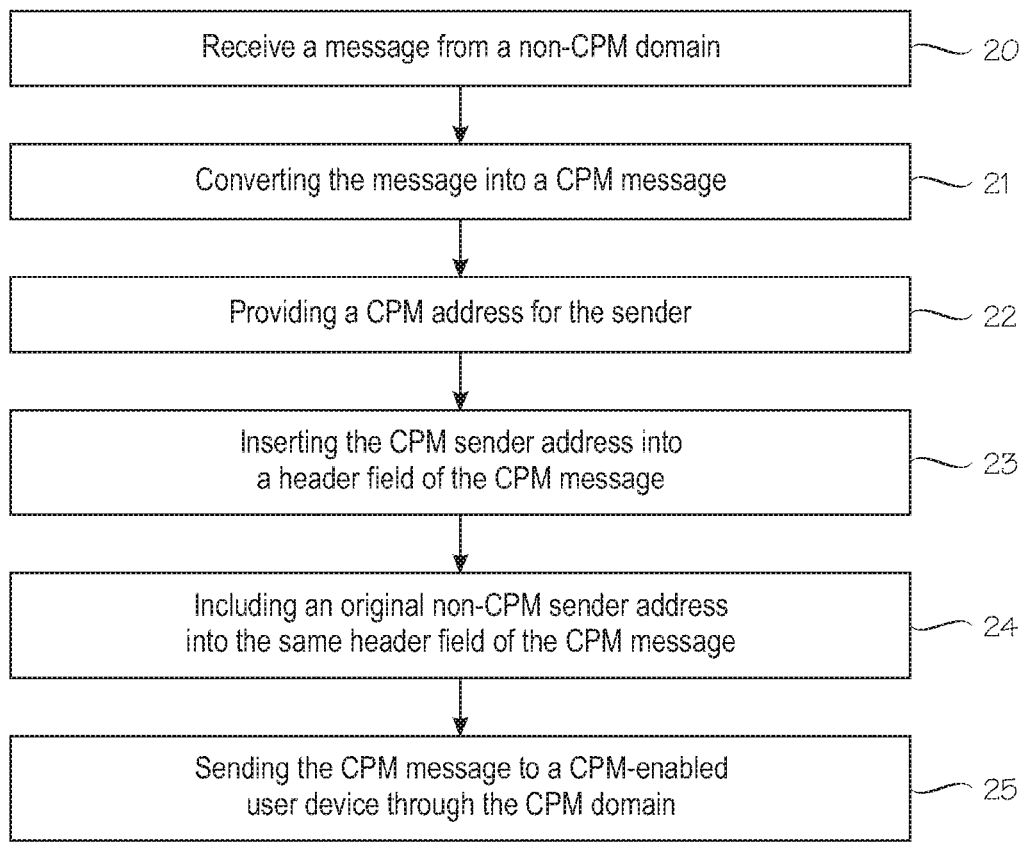
FIG. 2 is a flow diagram illustrating operation of an interworking function according to an embodiment of the invention.

Let us illustrate an exemplary messaging event. In the example, referring to FIGS. 1 and 2, the non-CPM user 10 decides to start a session with or send a message to the CPM user 14 and composes a message in his/her communication device with a messaging client of the non-CPM communication service. From the address book, the non-CPM user 10 selects the CPM user 14 to be the recipient. Upon selecting the send option, the non-CPM messaging client submits the request or message to the non-CPM messaging server in the non-CPM service domain 11. The non-CPM messaging server forwards the request or message towards the CPM service domain 13 and specifically to the CPM interworking function IWF 12. Upon receiving the request or message (step 20), the CPM interworking function IWF 12 that forms a gateway from the non-CPM domain 11 to the CPM domain 13 detects that the sender of the request/message is a non-CPM user 10, and therefore converts the non-CPM request/message to a CPM request/message (e.g. SIP request), step 21, and provides a new CPM address for the sender (step 22) to be placed in a header field (e.g. the P-Asserted-Identity field) of the CPM request/message, step 23. This conversion may include the adding of the original non-CPM sender identity/address into the same header field of the CPM request/message, step 24, as a part of the asserted CPM identity/address or as an attribute, and optionally also into another header field of the CPM request/message. Then interworking function IWF 12 sends the message to the CPM-enabled device of the recipient 14 via the CPM domain 13, step 25.

Figure 3:
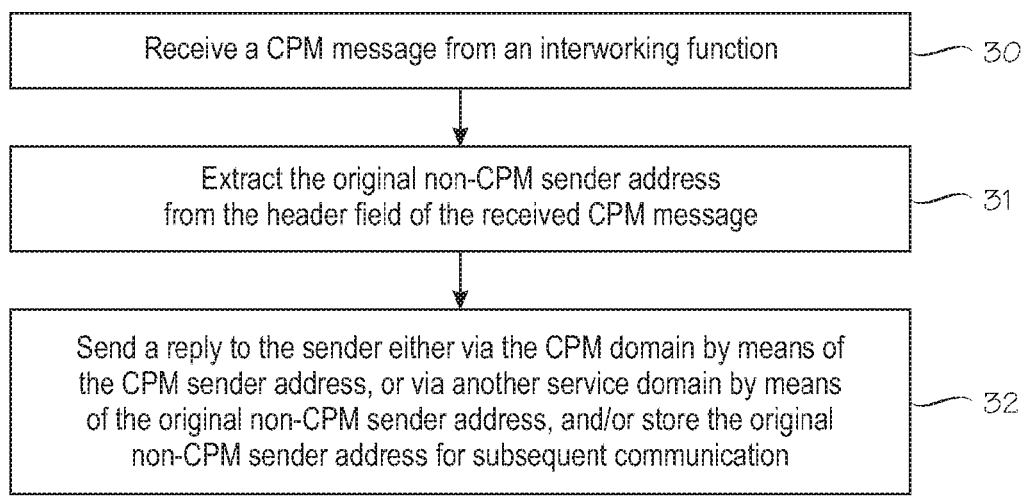
FIG. 3 is a flow diagram illustrating operation of a user communication device according to an embodiment of the invention.

Referring now to FIG. 3, upon receiving the CPM request/message according to the exemplary embodiments of the invention (step 30), the CPM client application in the CPM-enabled device of the recipient 14 is adapted to extract the original non-CPM sender identity/address from the relevant header field (step 31), and optionally display it to the CPM user 14. The recipient CPM user 14 is now able to respond, or decide on selection of the mode of the response to a request/message received from a non-CPM messaging domain 11. For example, the CPM user 14 may decide to send a reply to the sender 10 in the non-CPM messaging domain 11 selectively either via the interworking function IWF 12 by using the full content of the received P-Asserted-Identity header of the received CPM request, or directly to the non-CPM user 10 by means of the original non-CPM sender address extracted from the received P-Asserted-Identity header of the received CPM request (step 32). For example, if the non-CPM sender had originally sent an IMPS message or an email, the sender's original address may be provided to the recipient although the message is delivered via the CPM domain 13, in which such addressing is not applicable. As a result, the recipient, i.e. the CPM user 14, has an option to respond directly via the IMPS service domain or the Internet, without need to use the CPM service domain 13 for the response. Moreover, the CPM recipient 14 is able to store the original non-CPM sender address in the phonebook in the CPM-enabled communication device for future communication. Thus, the CPM user is able to initiate a new messaging to the original sender at any time, either via the CPM domain 13 or a non-CPM domain, without being bound to the mapping in the interworking function IWF 12.

In the following, some examples of the interworking according to the invention are described.

Example 1

According to an embodiment, the "From" and the "P-Asserted-Identity" header fields of the SIP request are utilized. Since the "P-Asserted-Identity" header field values must be in the form of SIP, SIPS or tel URI, the interworking function according to the exemplary embodiment is arranged to compose P-Asserted-Identity header field as the SIP/SIPS URI of the interworking function provided with an additional attribute containing the original non-CPM sender address that might have a different addressing scheme than SIP/SIPS/Tel URI.

Examples of attributes according to the exemplary embodiment are:

---

Org-Send = ' <value>'
Org-Recv = ' <value>'
<value> = Any legacy addressing format, e.g. mailto: sender@nokia.com, wv: sender@imps.tampere.fi, 0504995073, sender@yahoo.com, etc.

---

The "From" header field may contain the URI of the sender, which in the CPM recipient case could be (a) the original address of the sender in non-CPM network in an absolute URI format, such as mailto:sender@sending-network.com, or (b) SIP URI of the interworking function IWF, extended with the sender's original address in a attribute/header, or (c) the "From" header field may be left unspecified, if "P-Asserted-Identity" header field contains enough information.

For example, an interworking function IWF of a CPM domain may generate a "P-Asserted-Identity" of itself when forwarding a message received from 'mailto:sender@sending-network.com' as follows:

---

P-Asserted-Identity: "Nokia-Tampere IWF"
 <sip: iwf-nokia@hermi4-site.tampere.fi;Orig-Send
  = 'mailto: sender@sending-network.com>'

---

Thus, the attribute Orig-Send of the IWF Public Service Identity according to the invention gives the information of the original identity/address of the sender and in some cases the recipient as well.

As another example, a message is sent to +3583679920 from +49709936567. The interworking function IWF in the CPM domain may resolve the telephone number of the CPM recipient into Tel URI format for the "To" header field, but the IWF may also preserve both the original sender address and the original recipient address in the SIP request by means of the Orig-Send and Orig-Recv attributes as follows:

```
To: <sip:+3583679920@hermi4-site.tampere.fi;user=phone>
P-Asserted-Identity: "Nokia-Tampere IWF"
<sip:iwf-nokia@hermi4-site.tampere.fi;Orig-Send =
'+49709936567', Orig-Recv='+3583679920'>
```

Example 2

According to an embodiment, the "P-Asserted-Identity" header fields of the SIP request sent by the interworking function are utilized. Since the "P-Asserted-Identity" header field values must be in the form of SIP, SIPS or tel URI, the interworking function according to the exemplary embodiment is arranged to compose P-Asserted-Identity header field as the SIP/SIPS URI of the interworking function provided with an additional attribute, e.g. a "foreign-address" attribute, containing the original non-CPM sender address that might have a different addressing scheme than SIP/SIPS/Tel URI.

The "From" header of the SIP request sent by the interworking function may either be the same as the P-Asserted-Identity header; contain the non-CPM sender's address; or be unspecified.

The "To" header of the SIP request sent by the interworking function may either be composed as the SIP/SIPS URI of the interworking function provided with an additional attribute containing the original non-CPM recipient's address; contain the non-CPM recipient's address; or, be unspecified.

For example, let us assume that a complete sender non-CPM address is wv:sender@ForeignNetwork.com; a complete recipient non-CPM address is wv:recipient@OwnNetwork.com; a complete recipient CPM address in the examples is sip:recipient@OwnNetwork.com; and an IWF CPM address is sip:WVIWF@OwnNetwork.com. Let us further assume that the original non-CPM message was sent in a Wireless Village (WV) network from the complete sender non-CPM address to the complete recipient non-CPM address. The CPM message created by the interworking function IWF upon reception of the original non-CPM message may be, for instance:

```
MESSAGE sip:recipient@OwnNetwork.com SIP/2.0
P-Asserted-Identity:<sip:WVIWF@OwnNetwork.com;foreign-address=
"wv:sender@ForeignNetwork.com">
From:<sip:WVIWF@OwnNetwork.com;foreign-address=
"wv:sender@ForeignNetwork.com">
To:<sip:WVIWF@OwnNetwork.com;foreign-address=
"wv:recipient@OwnNetwork.com">
``` or

```
MESSAGE sip:recipient@OwnNetwork.com SIP/2.0
P-Asserted-Identity: <sip:WVIWF@OwnNetwork.com;foreign-address=
"wv:sender@ForeignNetwork.com">
```

```
From: wv:sender@ForeignNetwork.com
To: wv:recipient@OwnNetwork.com
```

Example 3

According to an embodiment, the "P-Asserted-Identity" header field of the SIP request sent by the interworking function are utilized. Since the "P-Asserted-Identity" header field values must be in the form of SIP, SIPS or tel URI, the interworking function according to the exemplary embodiment is arranged to place the original non-CPM sender address as a part of the SIP/SIPS URI of the interworking function in the P-Asserted-Identity header field. The CPM domain (including the SIP/IP Core network) is preferably set up in such a way that the host part of the IWF function address guarantees a delivery to the IWF function regardless of the user part value of the IWF function address. The CPM client in the CPM-enabled communication device of the recipient may be arranged to detect that the whole URI is composed of IWF host part and non-CPM address user part. The detection may be based on an additional attribute indicating that the whole URI is composed of IWF host part and non-CPM address user part; or on that all the host names of each IWFs have the same ending part, which is also provided to the CPM Client. For example, the host part of the WV IWF address may be WV.IWF.OwnNetwork.com, the host part of the e-mail IWF address may be MAIL.IWF.OwnNetwork.com, . . . and the client may be provided with an address ".IWF.OwnNetwork.com".

The CPM message created by the interworking function IWF upon reception of the original non-CPM message may then be, for instance:

```
MESSAGE sip:recipient@OwnNetwork.com SIP/2.0
P-Asserted-Identity: <sip:wv%3asender%40ForeignNetwork.com@WV.-
IWF.OwnNetwork.com>
From: <sip:wv%3asender%40ForeignNetwork.com@WV.IWF.-
OwnNetwork.com>
To: sip:wv%3arecipient%40OwnNetwork.com@WV.IWF.OwnNetwork.-
com>
``` or

```
MESSAGE sip:recipient@OwnNetwork.com SIP/2.0
P-Asserted-Identity: <sip:wv%3asender%40ForeignNetwork.com@WV.-
IWF.OwnNetwork.com>
From: wv:sender@ForeignNetwork.com
To: wv:recipient@OwnNetwork.com
```

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art. A communication terminal may refer to any user communication device. A term "communication device" as used herein may refer to any device having a communication capability, such as a wireless mobile terminal, a PDA, a smart phone, a personal computer (PC), a laptop computer, a desktop computer, etc. For example, the wireless communication terminal may be an UMTS or GSM/EDGE smart mobile terminal having S60 operating system from Nokia Corporation. Thus, the application capabilities of the device according to various embodiments of the invention may include native S60 applications available in the terminal, or subsequently installed applications. The interworking function IWF may be implemented in any network element, such as a server.

It will be obvious to a person skilled in the art that, as the technology advances, the inventive concept can be implemented in various ways. The invention and its embodiments are not limited to the examples described above but may vary within the scope of the claims.

The invention claimed is:

1. A method to interwork between messaging service technologies, comprising:
   receiving, at an interworking function, a message containing at least one of an original sender address and an identity, which is valid for sending messages in a messaging service of a non-converged messaging technology, but is not valid for sending messages in a messaging service of a converged messaging technology, the message addressed to a recipient operating in the messaging service of the converged messaging technology;
   determining, for the at least one of the received original sender address and identity, at least one of a new sender address and identity, which is valid in the messaging service of the converged messaging technology;
   inserting the new at least one of the sender address and identity in a header field of the message; and
   including the at least one of the original sender address and identity into the message, to enable a reply to the message via a route other than the interworking function,
   after a selection of an option to send the reply via the non-converged messaging technology rather than via the converged messaging technology.

2. A method as claimed in claim 1,
   wherein said message contains at least one of a recipient address and identity which is not valid in the messaging service of the converged messaging technology, and
   wherein the method further comprises
      providing for the recipient at least one of a new recipient address and identity which is valid in the second messaging service of the converged messaging technology, and
      including the recipient address as an attribute into said same header field of the message which includes the at least one of the original sender address and identity.

3. A method as claimed in claim 1,
   wherein said at least one of the new sender address and identity is a session initiation protocol uniform resource identifier, SIP URI, a secure session initiation protocol uniform resource identifier, SIPS URI, or a telephone uniform resource identifier, tel URI, and
   wherein the method further comprises
      inserting the new sender address in a P-Asserted-Identity header field of an SIP message to be forwarded to the recipient in the messaging service of the converged messaging technology, and
      including the original at least one of the sender address or identity into said P-Asserted-Identity header field of the SIP message either as a part of said new address or identity, or as an attribute.

4. A method as claimed in claim 3, comprising:
   including the original at least one of the sender address and identity to a From header field of the SIP message in at least one of a similar format as in the P-Asserted-Identity header field, and in the original format of the original sender address or identity.

5. A method as claimed in claim 3,
   wherein said message contains at least one of the recipient address and identity which is not valid in the messaging service of the converged messaging technology, and
   wherein the method further comprises
      providing for the recipient at least one of a new recipient address and identity which is valid in the messaging service of the converged messaging technology,
      including said at least one of the new recipient address and identity into a To header field of the SIP message, and
   including the recipient address as at least one of a part of said at least one of the new recipient address and identity, as an attribute into said P-Asserted-Identity header field of the SIP message, and as an attribute into said To header field of the SIP message.

6. A method as claimed in claim 3,
   wherein said message contains at least one of a recipient address and identity which is not valid in the messaging service of the converged messaging technology, and
   wherein the method further comprises including said at least one of the recipient address and identity into a To header field of the SIP message.

7. A method as claimed in claim 1, wherein said at least one of the new sender address and identity is an address or identity of the interworking function.

8. A method as claimed in claim 1, wherein said at least one of the new sender address and identity is at least one of an address and identity of the interworking function containing a host part and a user part, said user part containing said original sender address.

9. A method as claimed in claim 1, wherein said messaging service of the non-converged messaging technology comprises a communication service which allows to transport real time media or discrete media between two or more users, particularly media of one or more of the following services: Short Message Service (SMS), Multimedia Messaging Service (MMS), email, IMPS (Instant Messaging and Presence Service), Simple IM (SIP for Instant Messaging and Presence Leveraging Extensions/Instant Messaging), Voice over IP calls, PoC (Push-to-talk over Cellular).

10. A method as claimed in claim 1, wherein said messaging service of the converged messaging technology is a converged IP messaging (CPM) domain based on session initiation protocol (SIP) based technologies.

11. A messaging method for a user device, comprising:
    receiving, from an interworking function, a message containing at least one of an original sender address and identity, which is valid for sending messages in a messaging service of a non-converged technology, but is not valid for sending messages in a messaging service of a converged messaging technology, the message further containing at least one of a new sender address and identity which is valid in the messaging service of the converged messaging technology, the message addressed to a recipient operating in the messaging service of the converged messaging technology; and replying via a route other than the interworking function using the at least one of the original sender address and identity, after a selection of an option to send the reply via the non-converged messaging technology rather than via the converged messaging technology.

12. A method as claimed in claim 11,
wherein said at least one of the new sender address and identity is at least one of a session initiation protocol uniform resource identifier, SIP URI, a secure session initiation protocol uniform resource identifier, SIPS URI, and a telephone uniform resource identifier, tel URI,
wherein the new sender address is in a P-Asserted-Identity header field of an SIP message, and
wherein the original at least one of the sender address and identity is in said P-Asserted-Identity header field of the SIP message as a part of at least one of said new at least one of the sender address and identity, and an attribute.

13. A method as claimed in claim 12,
wherein the original at least one of the sender address and identity is in a From header field of the SIP message in at least one of a similar format as in the P-Asserted-Identity header field, and in the original format of the original sender address or identity.

14. A method as claimed in claim 11, wherein said at least one of the new sender address and identity is at least one of an address and identity of the interworking function.

15. A method as claimed in claim 11, wherein said at least one of the new sender address and identity is at least one of an address and identity of the interworking function containing a host part and a user part, said user part containing said original sender address.

16. A method as claimed in claim 11, wherein said messaging service of the non-converged messaging technology comprises a communication service which allows to transport real time media or discrete media between two or more users, particularly media of one or more of the following services: Short Message Service (SMS), Multimedia Messaging Service (MMS), email, IMPS (Instant Messaging and Presence Service), Simple/IM (SIP for Instant Messaging and Presence Leveraging Extensions/Instant Messaging), Voice over IP calls, PoC (Push-to-talk over Cellular).

17. A method as claimed in claim 11, wherein said messaging service of the converged messaging technology is a converged IP messaging (CPM) domain based on session initiation protocol (SIP) based technologies.

18. A network element comprising;
a processor configured to:
receive, at an interworking function, a message containing at least one of an original sender address and an identity, which is valid for sending messages in a messaging service of a non-converged messaging technology, but is not valid for sending messages in a messaging service of a converged messaging technology, the message addressed to a recipient operating in the messaging service of the converged messaging technology;
determine, for the at least one of the received sender address and identity, at least one of a new sender address and identity which is valid in the messaging service of the converged messaging technology;
insert the new at least one of the sender address and identity in a header field of the message; and
include the at least one of the original sender address and identity into the message, to enable a reply to the message via a route other than the interworking function,
after a selection of an option to send the reply via the non-converged messaging technology rather than via the converged messaging technology.

19. A computer program embodied on a non-transitory computer readable medium, the computer program containing an executable code which performs the steps according to claim 1, when executed in a computing device.

20. A communication device comprising;
a processor configured to:
receive, from an interworking function, a message containing at least one of an original sender address and identity, which is valid for sending messages in a messaging service of a non-converged messaging technology, but is not valid for sending messages in a messaging service of a converged messaging technology, the message further containing at least one of a new address and identity which is valid in the messaging service of the converged messaging technology, the message addressed to a recipient operating in the messaging service of the converged messaging technology; and
reply via a route other than the interworking function using the at least one of the original sender address and identity,
after a selection of an option to send the reply via the non-converged messaging technology rather than via the converged messaging technology.

21. A computer program embodied on a non-transitory computer readable medium, the computer program containing an executable code which performs the steps according to claim 11, when executed in a computing device.

22. A method as claimed in claim 1, wherein the including of the at least one of the original sender address and identity in the message, enables a selection to reply to the message via one of the interworking function and another route.

23. A method as claim in claim 1, wherein the determining of at least one of a new sender address and identity is based on detecting that there is at least one non-converged messaging technology.

* * * * *